United States Patent
Jang

(10) Patent No.: US 8,625,310 B2
(45) Date of Patent: Jan. 7, 2014

(54) METHOD OF SUPPLYING POWER, POWER SUPPLY APPARATUS FOR PERFORMING THE METHOD AND DISPLAY APPARATUS HAVING THE APPARATUS

(75) Inventor: Hyeon-Yong Jang, Osan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 1119 days.

(21) Appl. No.: 12/574,232

(22) Filed: Oct. 6, 2009

(65) Prior Publication Data

US 2010/0265231 A1    Oct. 21, 2010

(30) Foreign Application Priority Data

Apr. 15, 2009   (KR) .................. 10-2009-0032584

(51) Int. Cl.
*H02M 3/335* (2006.01)
*H02M 7/537* (2006.01)

(52) U.S. Cl.
USPC .............. 363/21.02; 363/24; 363/25; 363/26; 363/95; 363/131; 363/133

(58) Field of Classification Search
USPC ............... 363/21.02, 24, 25, 26, 95, 131, 133
See application file for complete search history.

(56) References Cited

U.S. PATENT DOCUMENTS

| | | | |
|---|---|---|---|
| 5,345,374 A * | 9/1994 | Sato et al. | 363/24 |
| 6,316,883 B1 * | 11/2001 | Cho et al. | 315/247 |
| 7,046,526 B2 * | 5/2006 | Toda et al. | 363/24 |
| 7,170,761 B2 * | 1/2007 | Yasumura | 363/17 |
| 7,242,595 B2 * | 7/2007 | Yasumura | 363/21.02 |
| 7,298,634 B2 * | 11/2007 | Yasumura | 363/24 |
| 2003/0137853 A1 * | 7/2003 | Zaitsu et al. | 363/25 |
| 2009/0231887 A1 * | 9/2009 | Ye et al. | 363/21.02 |
| 2010/0046251 A1 * | 2/2010 | Kyono | 363/21.02 |
| 2010/0109571 A1 * | 5/2010 | Nishino et al. | 315/307 |
| 2010/0182804 A1 * | 7/2010 | Yang | 363/21.02 |
| 2011/0280047 A1 * | 11/2011 | Chen | 363/21.02 |

FOREIGN PATENT DOCUMENTS

| | | |
|---|---|---|
| JP | 1996-509354 | 10/1996 |
| JP | 10-257765 | 9/1998 |
| KR | 1020070032256 | 3/2007 |

* cited by examiner

*Primary Examiner* — Bao Q Vu

(74) *Attorney, Agent, or Firm* — F. Chau & Associates, LLC

(57) ABSTRACT

A power supply apparatus includes an AC-DC rectifier, a transformer, a feedback inductor, a resonant unit, and a primary and auxiliary switch. The AC-DC rectifier rectifies an input voltage. The transformer includes a primary coil having a first primary coil and an isolated second primary coil, and transforms a first voltage of the primary coil into a second voltage of the secondary coil. The feedback inductor is connected to a tap between the first primary coil and second primary coil and an output of the AC-DC rectifier. The resonance unit is connected in parallel with the secondary coil and is configured to output an output voltage by rectifying the second voltage provided from the secondary coil. The primary switch and secondary switch are connected in parallel between the transformer and AC-DC rectifier.

20 Claims, 5 Drawing Sheets

METHOD OF SUPPLYING POWER, POWER SUPPLY APPARATUS FOR PERFORMING THE METHOD AND DISPLAY APPARATUS HAVING THE APPARATUS

CROSS-REFERENCE TO RELATED APPLICATIONS

This application claims priority under 35 U.S.C. §119 to Korean Patent Application No. 2009-32584, filed on Apr. 15, 2009 in the Korean Intellectual Property Office (KIPO), the disclosure of which is incorporated by reference in its entirety herein.

BACKGROUND

1. Technical Field

Exemplary embodiments of the present invention relate to a method of supplying power, a power supply apparatus for performing the method and a display apparatus having the apparatus. More particularly, exemplary embodiments of the present invention relate to a method of supplying power for reducing power loss, a power supply apparatus for performing the method and a display apparatus having the apparatus.

2. Discussion of Related Art

A liquid crystal display apparatus may include a display panel, which displays images using the light transmittance of liquid crystal molecules, and a backlight assembly disposed under the display panel to provide the display panel with light.

The display panel may include an array substrate, a color filter substrate and a liquid crystal layer interposed between the array substrate and the color filter. The array substrate may include a plurality of pixel electrodes and a plurality of thin-film transistors (TFTs) electrically connected to the pixel electrodes. The color filter substrate may include a common electrode and a plurality of color filters.

When an electric field is applied to the liquid crystal layer, the arrangement direction of the liquid crystal molecules of the liquid crystal layer is changed so that the light transmittance is changed. For example, when the light transmittance is increased to a maximum value, the display panel realizes a white image having a high luminance. However, when the light transmittance is decreased to a minimum value, the display panel realizes a black image having a low luminance.

The backlight assembly may include an inverter. The inverter converts a direct current (DC) voltage into an alternating current (AC) voltage. The DC voltage is applied to the backlight assembly according to a brightness control voltage from an external device. An inverter controller included in the inverter turns on a light source by providing the light source with the converted AC voltage and controls the brightness of the light source. The DC voltage may be provided from a power supply apparatus included in the display apparatus.

The power supply apparatus receives an AC voltage from an external AC input part to provide the DC voltage to the inverter and the display panel. However, a power factor at an input part receiving the AC voltage decreases when the power supply apparatus converts the AC voltage to the DC voltage by using a capacitor input type rectifier. Additionally, power loss is caused by switching operations of switching elements in the power supply apparatus.

Thus, there is a need for a method of supplying power to improve a power factor and reduce power loss, a power supply apparatus for performing the method, and a display apparatus having the power supply apparatus.

SUMMARY

An exemplary embodiment of the present invention includes a method of supplying power. The method includes rectifying an input voltage received from an external device, transforming a first voltage across a first primary coil and a second primary coil into a second voltage across a secondary coil isolated from the primary coils, the first voltage based on the rectified input voltage, providing a feedback current from the secondary coil to the primary coils, using a series resonance to convert the second voltage to an output voltage, and outputting the output voltage.

An exemplary embodiment of the present invention includes a power supply apparatus. The power supply apparatus includes an alternating current to direct current (AC-DC) rectifier, a transformer, a feedback inductor, a resonance unit, and a primary switch and an auxiliary switch. The AC-DC rectifier rectifies an input voltage received from an external device. The transformer includes a primary coil having a first primary coil and a second primary coil, and a secondary coil isolated from the primary coil. The transformer transforms a first voltage of the primary coil into a second voltage of the secondary coil. The feedback inductor is connected to a tap between the first primary coil and the second primary coil and an output of the AC-DC Rectifier. The resonance unit is connected in parallel with the secondary coil and is configured to output an output voltage by rectifying the second voltage provided from the secondary coil. The primary and auxiliary switches are connected in parallel between the transformer and the AC-DC rectifier.

An exemplary embodiment of the present invention includes a display apparatus. The display apparatus includes a display panel, a panel driving unit, a backlight unit and a power supply apparatus. The power supply apparatus includes an alternating current to direct current (AC-DC) rectifier, a transformer, a power factor correction unit, a resonance unit and an active clamp unit. The AC-DC rectifier rectifies an input voltage received from an external device. The transformer includes a primary coil having a first primary coil and a second primary coil, and a secondary coil isolated from the primary coil. The transformer transforms a first voltage of the primary coil into a second voltage of the secondary coil in a transformation ratio. The power factor correction unit includes a feedback inductor which increases or decreases a feedback current linearly by controlling the transformation ratio, based on a voltage applied to the first primary coil and the rectified input voltage. The resonance unit outputs an output voltage by rectifying the second voltage provided from the secondary coil. The active clamp unit adjusts the level of the first voltage based on a duty ratio, which is adjusted in accordance with the output voltage.

BRIEF DESCRIPTION OF THE DRAWINGS

Exemplary embodiments of the present invention will be more clearly understood from the following detailed description taken in conjunction with the accompanying drawings, in which.

DETAILED DESCRIPTION OF THE EMBODIMENTS

The present invention is described more fully hereinafter with reference to the accompanying drawings, in which exemplary embodiments of the present invention are shown. The present invention may, however, be embodied in many different forms and should not be construed as limited to the exemplary embodiments set forth herein.

Figure 1:
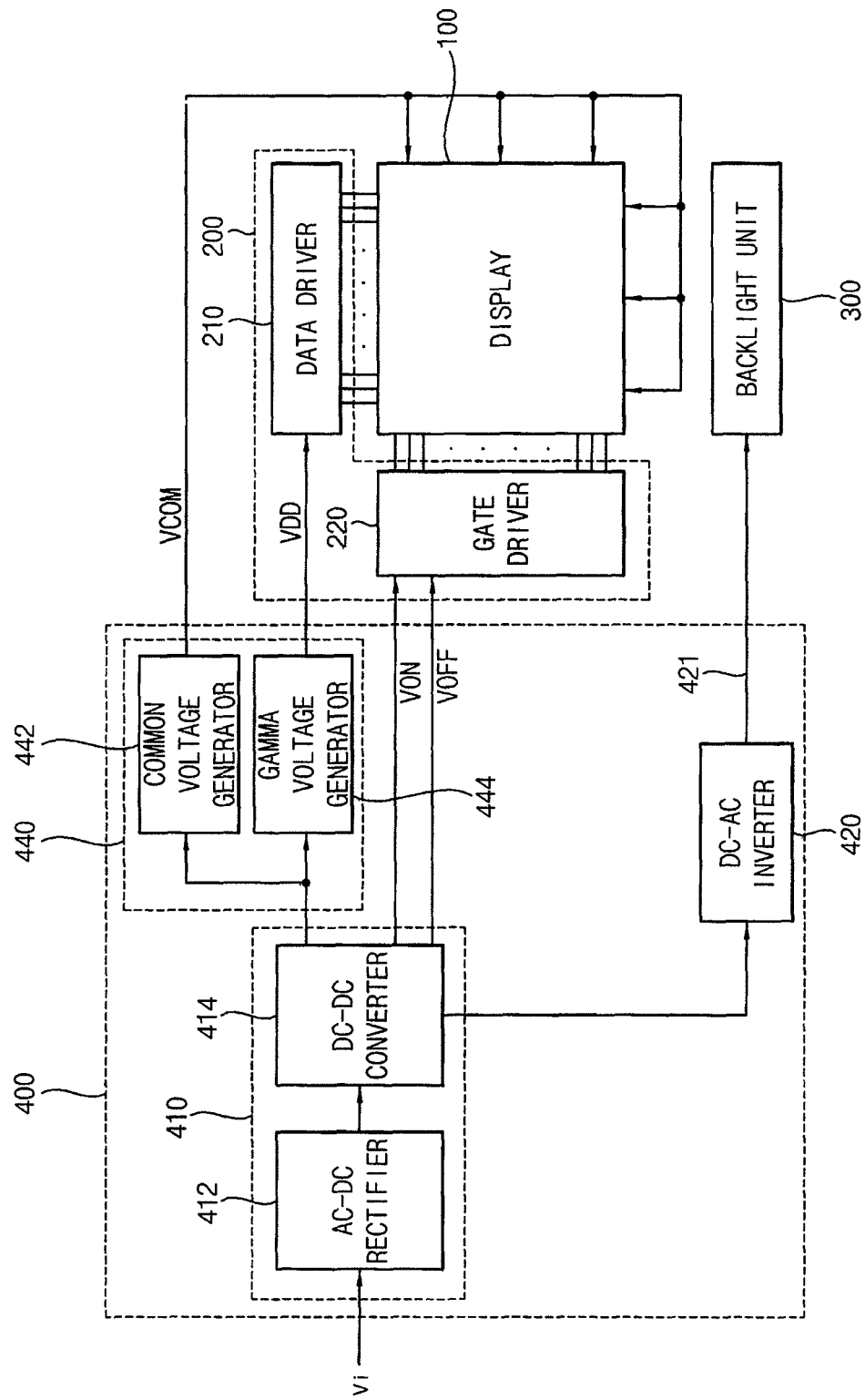
FIG. 1 is a block diagram illustrating a display apparatus according to an exemplary embodiment of the present invention.

Hereinafter, exemplary embodiments of the present invention will be explained in detail with reference to the accompanying drawings. FIG. 1 is a block diagram illustrating a display apparatus according to an exemplary embodiment of the present invention. Referring to FIG. 1, the display apparatus includes a display panel 100, a panel driving unit 200, a backlight unit 300 and a power supply part 400.

In an exemplary embodiment of the present invention, an external alternating current (AC) input part (not shown) receives a general AC voltage having a voltage level ranging between about 100 volts and about 240 volts and provides the general AC voltage to the power supply part 400. However, this voltage range is merely an example, as various other voltages ranges may be accepted by the power supply part 400. The power supply part 400 may be provided with the general AC voltage by putting an electric plug into a plug-socket.

The power supply part 400 includes a power supply apparatus 410, a direct current (DC)-AC inverter 420 and a voltage converter 440. The power supply part 400 converts the general AC voltage into voltages that are used by the panel driving unit 200 and the backlight unit 300. The display panel 100 may display images provided from an external graphic controller (not shown).

The power supply apparatus 410 includes an AC-DC rectifier 412 and a DC-DC converter 414. The AC-DC rectifier 412 performs a power factor correction and converts the general AC voltage (e.g., a voltage between about 100 volts and about 240 volts) into a DC voltage having a high voltage level to provide the DC-DC converter 414 with the converted DC voltage.

The AC-DC rectifier 412 may include a diode rectifier circuit or an active pulse width modulation (PWM) rectifier circuit. The DC-DC converter 414 converts the high voltage level of the DC voltage to provide the DC-AC inverter 420, the voltage converter 440 and the panel driving unit 200 with the converted high voltage level.

The DC-DC converter 414 may be embodied by a boost converter, a buck converter, a half-bridge converter, a flyback converter, a full-bridge converter, a push-pull converter, a forward converter, etc.

The DC-AC inverter 420 converts the high voltage generated from the AC-DC rectifier 412, for example a high DC voltage having a voltage level between about 500 volts and 600 volts, into an AC voltage 421 appropriate for the backlight unit 300 and outputs the AC voltage 421.

The DC-AC inverter 420 may be embodied by an inverter that is rated for driving a high voltage, for example, a voltage level between 500 volts and 600 volts. Inverters that are rated for driving low voltages, for example, a voltage level between 5 volts and 12 volts, may not be suitable for the DC-AC inverter 420. For example, the DC-AC inverter 420 may be embodied by a Royer inverter, a push-pull inverter, a half-bridge inverter, a full-bridge inverter, etc.

The backlight unit 300 may include fluorescent lamps and/or light-emitting diodes (LEDs). The backlight unit 300 is disposed below the display panel 100, controls a light level based on the AC voltage 421 provided from the DC-AC inverter 420, and provides light having a controlled light level to the display panel 100.

The voltage converter 440 includes a common voltage generator 442 and a gamma voltage generator 444. The common voltage generator 442 generates a common voltage VCOM based on the DC voltage from the DC-DC converter 414. The common voltage VCOM is applied to the display panel 100. The DC voltage, of which the level has been converted and is provided to the common voltage generator 442, may be a power supply signal of the common voltage generator 442.

The DC-DC converter 414 may include one of a boost converter, a buck converter, a half-bridge converter, a flyback converter, a push-pull converter, a forward converter, etc.

The gamma voltage generator 444 generates a gamma voltage VDD based on the DC voltage from the DC-DC converter 414, and provides the gamma voltage VDD to a data driver 210 included in the panel driving unit 200. The DC voltage, of which the level has been converted and is provided to the gamma voltage generator 444, may be a gamma reference voltage.

The panel driving unit 200 includes the data driver 210 and a gate driver 220. The data driver 210 may generate a gradation display voltage corresponding to a data gradation based on the gamma voltage VDD from the gamma voltage generator 444 to provide the display panel 100 with the data display voltage.

The gate driver 220 receives a gate-on voltage VON and a gate-off voltage VOFF from the DC-DC converter 414 to provide the display panel 100 with the gate-on voltage VON and the gate-off voltage VOFF.

The display panel 100 provides a liquid crystal layer (not shown) disposed between an upper substrate (not shown) and an lower substrate (not shown) with the gradation display voltage from the data driver 210 and the common voltage VCOM from the common voltage generator 442 based on the gate-on/gate-off signal VON/VOFF from the gate driver 220 so that the display panel 100 displays data.

Figure 2:
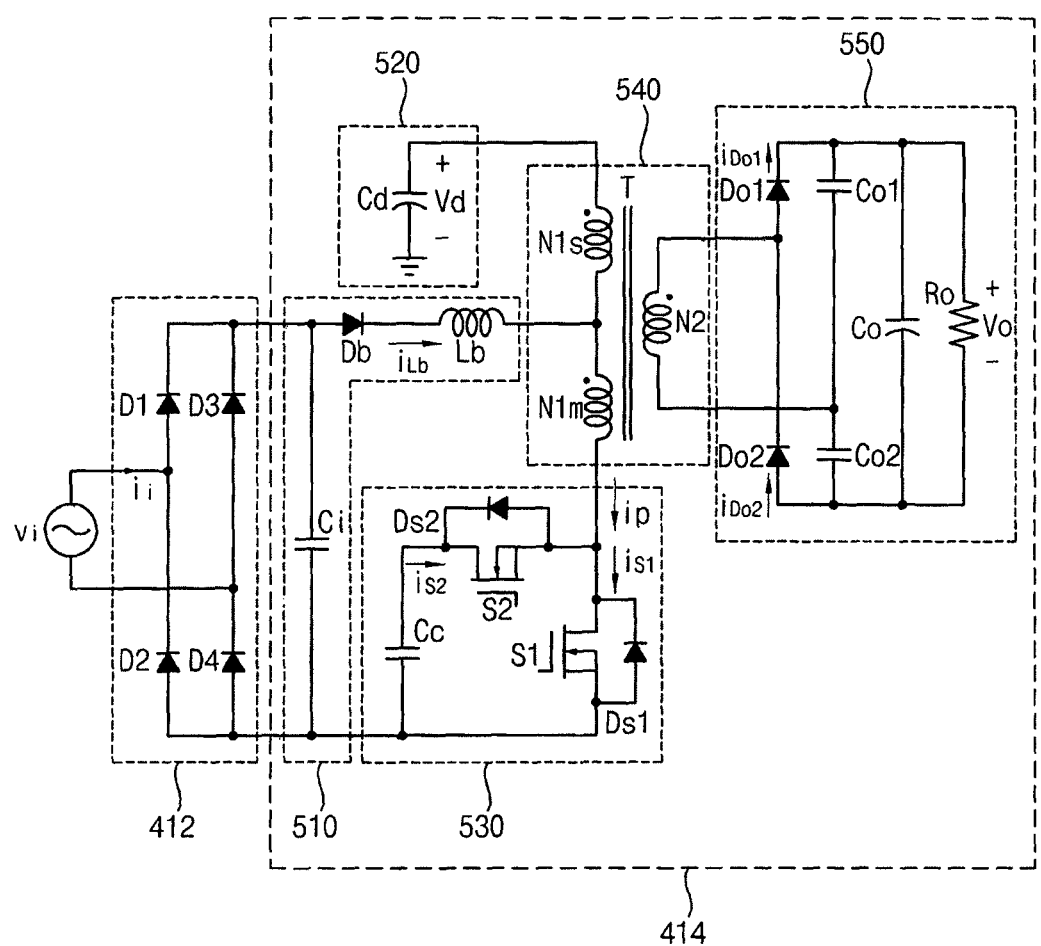
FIG. 2 is a circuit diagram illustrating a power supply part in FIG. 1 according to an exemplary embodiment of the present invention.

FIG. 2 is a circuit diagram illustrating a power supply part 400 in FIG. 1 according to an exemplary embodiment of the present invention. Referring to FIGS. 1 and 2, the AC-DC rectifier 412 includes a first diode D1, a second diode D2, a third diode D3 and a fourth diode D4, which are connected through a full bridge diode. The AC-DC rectifier 412 receives the general AC voltage (e.g., a voltage between about 100 volts and about 240 volts) from the AC input part as an input voltage Vi, and rectifies the input voltage Vi to provide the DC-DC converter 414 with the rectified input voltage Vi.

Accordingly, the AC-DC rectifier 412 rectifies the AC voltage provided through the first and second diodes D1 and D2 connected in series, and the third and fourth diodes D3 and D4 connected in series.

The DC-DC converter 414 includes a power factor correction unit 510, a voltage smoothing capacitor 520, an active clamp unit 530, a transformer 540 and a resonance unit 550.

The transformer 540 includes a primary coil N1 and a secondary coil N2. A voltage applied to the primary coil N1 represents a first voltage, and a voltage applied to the secondary coil N2, which is isolated from the primary coil N1, represents a second voltage. The transformer 540 includes a transformer tap. A transformer tap is a connection point along a transformer winding that allows a certain number of turns to be selected. The transformer 540 with the tap has an adjustable turns ratio, enabling voltage regulation of its output. A transformation ratio may be adjusted according to a point of the tap.

According to an exemplary embodiment of the present invention, a coil formed on an upper portion of the tap of the primary coil N1 is denoted as a second primary coil N1$s$ and a coil formed on an under portion of the tap of the primary coil N1 is denoted as a first primary coil N1$m$. A first end of the second primary coil N1$s$, a first end of the first primary coil N1$m$, and a first end of a feedback inductor Lb in the power factor correction unit 510 are connected to the tap. Thus, the first voltage applied to primary coil N1 may be transformed into the second voltage applied to secondary coil N2 with the transformation ratio.

The power factor correction unit 510 includes an input capacitor Ci, a feedback diode Db and the feedback inductor Lb. The power factor correction unit 510 is connected to the transformer 540 to enlarge or reduce an input current $i_i$ according to the input voltage Vi. The input capacitor Ci is connected between ends of the AC-DC rectifier 412.

The first and fourth diodes D1 and D4 are turned on when the input voltage Vi is positive, and the second and third diodes D2 and D3 are turned on when the input voltage Vi is negative so that the input capacitor Ci stores electric charges.

A first end of the voltage smoothing capacitor 520 is connected to a second end of the second primary coil N1$s$, and a second end of the voltage smoothing capacitor 520 is grounded. Electrical energy is stored in the voltage smoothing capacitor 520 after having passed through the AC-DC rectifier 412 and the power factor correction unit 510. A voltage at the voltage smoothing capacitor 520 is a smoothing voltage Vd.

The active clamp unit 530 includes a primary switch S1, an auxiliary switch S2 and a clamp capacitor Cc. A first end of the primary switch S1 is connected to a second end of the first primary coil N1$m$, and a second end of the primary switch S2 is connected to a first end of the AC-DC rectifier 412. The auxiliary switch S2 and the clamp capacitor Cc connected in series are connected to the primary switch S1 in parallel.

The primary switch S1 and the auxiliary switch S2 are alternately turned on. Each of the primary switch S1 and the auxiliary switch S2 is connected to a primary diode Ds1 and a secondary diode Ds2, in parallel, respectively. Thus, the primary switch S1 and the auxiliary switch S2 may perform zero-voltage switching.

The clamp capacitor Cc absorbs a spike voltage, which may be provided to the primary switch S1. Thus, voltage stress and power loss at the primary switch S1 may be reduced.

In addition, the primary switch S1 and the auxiliary switch S2 corresponding to the first primary coil N1$m$ may perform the zero-voltage switching due to leakage inductance in the transformer 540. Thus, high-speed switching may be possible and power loss may be reduced. Leakage inductance is a property of an electrical transformer that causes a winding to appear to have some inductance in series with the mutually-coupled transformer windings.

When the primary switch S1 is turned on and the input voltage Vi is greater than a voltage applied to the first primary coil N1$m$, a current caused by charges in the input capacitor Ci flows through the feedback diode Db and the feedback inductor Lb. When the input voltage Vi is greater than the voltage applied to the first primary coil N1$m$, a fixed voltage is applied to the feedback inductor Lb so that the feedback current $i_{Lb}$ linearly increases.

When the auxiliary switch S2 is turned on and the input voltage Vi is less than or equal to a voltage applied to the first primary coil N1$m$, the fixed voltage is applied to the feedback inductor Lb so that the feedback current $i_{Lb}$ linearly decreases. When the input voltage Vi is then greater than the voltage applied to the first primary coil N1$m$, the current is '0'.

When the input voltage Vi is less than or equal to the voltage applied to the first primary coil N1$m$, a fixed voltage is applied to the feedback inductor Lb so that the current linearly decreases.

The current that flows through the feedback inductor Lb affects the input current $i_i$, and the input current $i_i$ is proportional to the input voltage Vi so that a power factor is improved. The improvement of the power factor is based on an impedance magnitude of the feedback inductor Lb and the first primary coil N1$m$.

The secondary coil N2 of the transformer 540 is connected to the resonance unit 550, which includes a first resonant diode Do1, a second resonant diode Do2, a first resonant capacitor Co1, and a second resonant capacitor Co2. The resonance unit 550 may be a resonance circuit.

The primary switch S1 and the auxiliary switch S2 are asymmetrically turned on. When the primary switch S1 is turned on, a series resonator including the first and second resonant capacitors Co1 and Co2 transfers energy to the secondary coil N2.

When the primary switch S1 is turned off, the auxiliary switch S2 is turned on and the series resonator including the first and second resonant capacitors Co1 and Co2 transfers energy to the secondary coil N2.

Additionally, when the primary and auxiliary switches S1 and S2 are asymmetrically turned on, the first and second resonant diodes Do1 and Do2 corresponding to the secondary coil N2 perform zero-current switching using the series resonator. Thus, power loss may be reduced through reverse recovery characteristics of the first and second resonant diodes Do1 and Do2.

A full waveform having a peak current lesser than a current flowing through the secondary coil N2 in the transformer 540 may be generated from a sine current waveform generated by the series resonator including the first and second resonant capacitors Co1 and Co2. Thus, ripple characteristics and the capacitance of an output capacitor Co may be improved.

The DC-DC converter 414 may further include an output voltage control circuit (not shown) between the active clamp unit 530 and the resonance unit 550. The output voltage control circuit may control a duty ratio of an output voltage Vo applied to the primary switch S1. In this example, the output voltage Vo is a rectified voltage from the second voltage of the secondary coil N2 and applied to an output resistance Ro. The resonance unit 550 may further include the output capacitor Co disposed in parallel with the output resistance Ro.

The primary coil N1 and the secondary coil N2 in the transformer 540 may be electrically insulated. The transformer 540 may include a plurality of inductors, which have been separately used for circuits and wound around one core. The output voltage Vo may be adjusted by adjusting a duty ratio of the primary switch S1 by using the feedback from the output voltage Vo at the output resistance Ro. Thus, the duty ratio of the primary switch S1 may be adjusted based on a duty ratio of the adjusted output voltage Vo so that the level of the first voltage may be adjusted.

Figure 3:
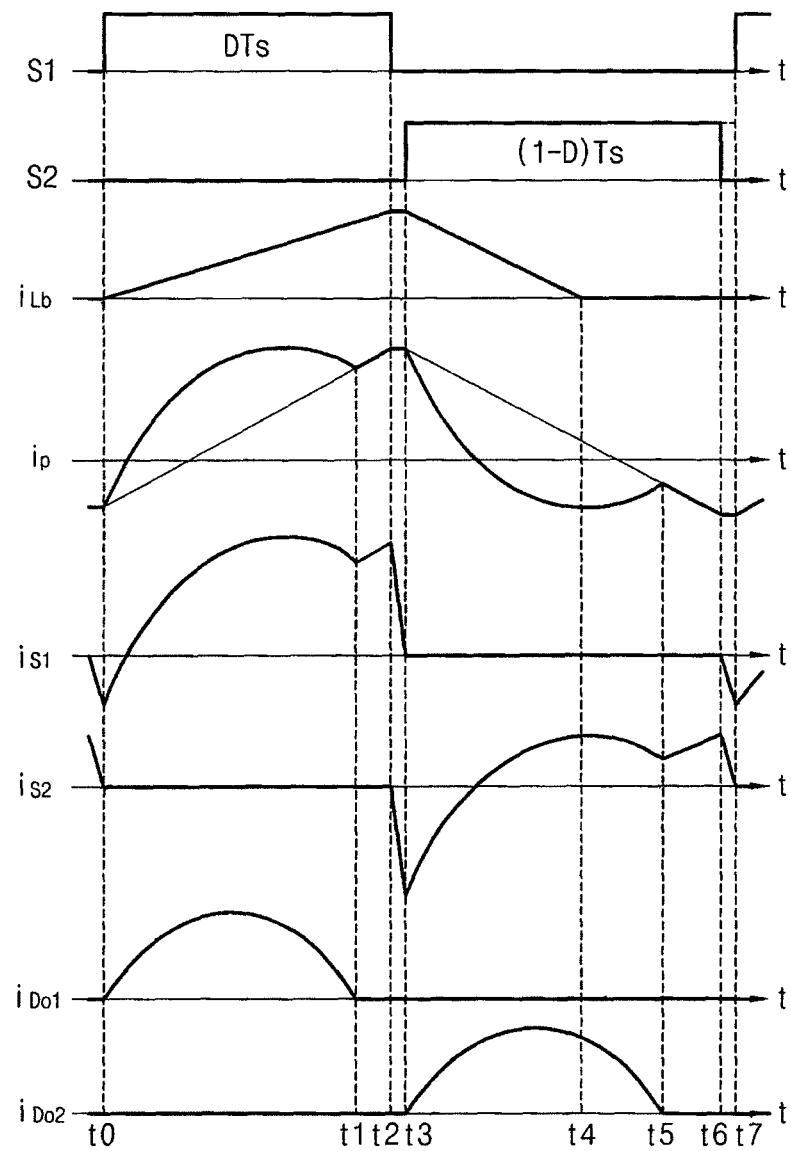
FIG. 3 is a waveform diagram illustrating examples of current flowing in elements of a direct current to direct current (DC-DC) converter of FIG. 1 according to an exemplary embodiment of the present invention.

FIG. 3 is a waveform diagram illustrating examples of current flowing in elements of the DC-DC converter of FIG. 2. Referring to FIGS. 2 and 3, the primary and second switches S1 and S2 operate asymmetrically.

When the primary switch S1 is turned on and the input voltage Vi is greater than a voltage applied to the first primary coil N1m, the fixed voltage is applied to the feedback inductor Lb so that a feedback current $i_{Lb}$ flowing through the feedback inductor Lb linearly increases.

When the auxiliary switch S2 is turned on and the input voltage Vi is less than or equal to a voltage applied to the first primary coil N1m, the fixed voltage is applied to the feedback inductor Lb so that the feedback current $i_{Lb}$ linearly decreases. Then, the feedback current $i_{Lb}$ is '0' when the input voltage Vi is greater than the voltage applied to the first primary coil N1m.

A resonance current $i_p$ applied to the active clamp unit 530, is a difference between a primary switch current $i_{S1}$ flowing through the primary switch S1 and an auxiliary switch current $i_{S2}$ flowing through the auxiliary switch S2. A first resonance current $i_{Do1}$ flows through the first resonant diode Do1, and a second resonance current $i_{Do2}$ flows through the first resonant diode Do2.

The primary switch S1 is turned off before an initial time (e.g., time t0) and the primary switch S1 is turned on during a time period of DTs after time t0 (e.g., time period to-t1).

During time period DTs, the primary switch current $i_{S1}$ and the resonance current $i_p$ increase. The primary switch current $i_{S1}$ and the resonance current $i_p$ may be sine waveforms. Additionally, the first resonant diode Do1 is turned on.

From time t1 to t2, before the primary switch S1 is turned off, the primary switch current $i_{S1}$ and the resonance current $i_p$ increase due to a series resonance and the first resonance current $i_{Do1}$ (which is '0') flowing through the first resonant diode Do1 due to the series resonance. Thus, the first resonant diode Do1 and the second resonant diode Do2 are turned off.

From time t2 to t3, after the primary switch S1 is turned off and before the auxiliary switch S2 is turned off, the primary switch current $i_{S1}$ rapidly decreases and the auxiliary switch current $i_{S2}$ rapidly decreases. Therefore, the primary switch S1 and the auxiliary switch S2 may perform the zero-voltage switching. Here, the auxiliary switch S2 turns on for during a time period (1−D)Ts (e.g., from t3 to t6).

From time t3 at which the auxiliary switch S2 is turned on, the auxiliary switch current $i_{S2}$ (e.g., which may be a sine waveform) increases so that the resonance current $i_p$ (which may be a sine waveform) decreases and the primary switch current $i_{S1}$ is '0'. Additionally, the second resonant diode Do2 is turned on.

From time t4 from which the input voltage Vi is greater than the first voltage, the feedback current $i_{Lb}$, which flows through the feedback inductor Lb, is '0', reaching its lowest value.

From time t5 to t6 before the auxiliary switch S2 is turned on, the auxiliary switch current $i_{S2}$ increases and the resonance current $i_p$ decreases by the series resonance and the second resonance current $i_{Do2}$ is '0', which flows through the second resonant diode Do2 by the series resonance. Thus, the first resonant diode Do1 and the second resonant diode Do2 are turned off.

Accordingly, the active clamp unit 530 generates the resonance current $i_p$ by using the leakage inductance in the transformer 540, with the first and second resonating capacitors Co1 and Co2 in the resonance unit 550 when the primary and auxiliary switches S1 and S2 are turned on and/or turned off.

The active clamp unit 530 transfers the energy to the secondary coil N2 so that the primary and auxiliary switches S1 and S2 may perform the zero-voltage switching and the first and second resonant diodes Do1 and Do2 may perform the zero-current switching.

Figure 4:
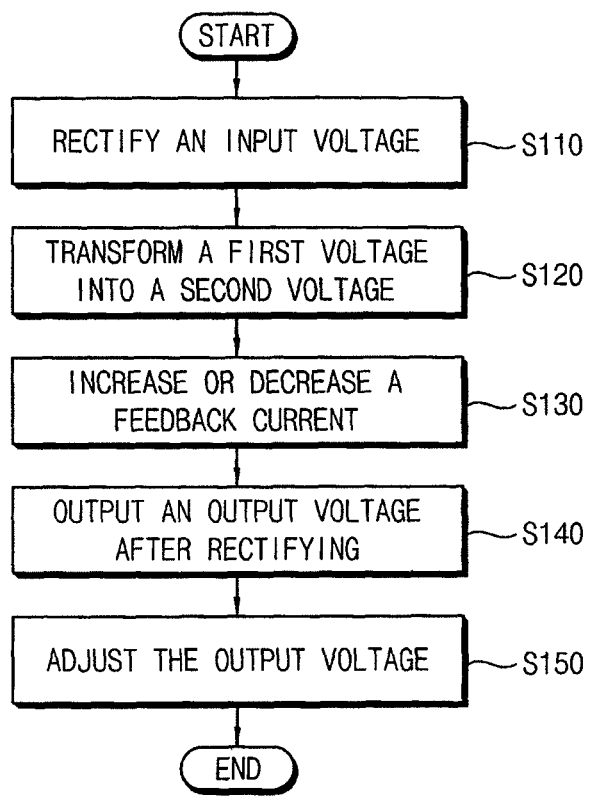
FIG. 4 is a flowchart illustrating a method of supplying power of the power supply part in FIG. 1 according to an exemplary embodiment of the present invention.

FIG. 4 is a flowchart illustrating a method of supplying power of the power supply part in FIG. 1 according to an exemplary embodiment of the present invention. Referring to FIGS. 2 to 4, the AC-DC rectifier 412 rectifies the input voltage Vi from the AC input part (step S110). Then, the transformer 540 transforms the first voltage based on the input voltage Vi into the second voltage (step S120). Then, the active clamp unit 530 increases or decreases the feedback current $i_{Lb}$ linearly based on the input voltage Vi and the first voltage so that the input current $i_i$ corresponding to the input voltage Vi follows a conversion of the input voltage Vi (step S130).

For example, when the primary switch S1 is turned on and the input voltage Vi is greater than a voltage applied to the first primary coil N1m, the feedback current $i_{Lb}$ linearly increases.

Likewise, when the auxiliary switch S2 is turned on and the input voltage Vi is less than or equal to a voltage applied to the first primary coil N1m, the feedback current $i_{Lb}$ linearly increases. When the input voltage Vi is greater than the voltage applied to the first primary coil N1m, the feedback current $i_{Lb}$ is '0'.

Then, the first and second resonant capacitors Co1 and Co2 of the resonance unit 550 performs a series resonance using the first and second resonant diodes Do1 and Do2 to perform the zero-current switching. Thus, the resonance unit 550 may output the rectified output voltage Vo based on the second voltage (step S140).

The active clamp unit 530 controls the output voltage Vo based on the duty ratio of an output voltage Vo (step S150). Here, the duty ratio may be controlled by the output voltage control circuit (not shown) disposed between the resonance unit 550 and the active clamp unit 530. The active clamp unit 530 turns on and/or turns off the primary switch S1 or the auxiliary switch S2 based on the duty ratio. The primary switch S1 and the auxiliary switch S2 operate asymmetrically.

Thus, the power supply apparatus 410 converts the input voltage Vi (e.g., the general AC voltage) into the output voltage Vo (e.g., a DC voltage) to provide the output voltage Vo to the display panel 100, the panel driving unit 200 and the backlight unit 300.

For example, the common voltage generator 442 generates the common voltage VCOM to provide the display panel 100 with the common voltage VCOM based on the output voltage Vo from the power supply apparatus 410. The gamma voltage generator 444 generates the gamma voltage VDD to provide the data driver 210 with the gamma voltage VDD. In addition, the output voltage Vo is provided to the gate driver 220 as a gate-on voltage VON and a gate-off voltage VOFF.

The backlight unit 300 may receive an adequate AC voltage corresponding to an external brightness of the backlight unit 300. The DC-AC inverter 420 converts the output voltage Vo (e.g., a DC voltage) into the adequate AC voltage to provide the AC voltage to the backlight unit 300. The converted adequate AC voltage turns on the backlight unit 300 and controls the brightness of the backlight unit 300.

According to at least one embodiment of the present invention, the feedback current $i_{Lb}$ may linearly increase so that the input current $i_i$ corresponding to the input voltage Vi follows a conversion of the input voltage Vi based on the rectified input voltage and the first voltage applied to a portion of primary coil N1 of the transformer 540. Thus, a power factor may be improved.

Additionally, the primary and auxiliary switches S1 and S2 may perform the zero-voltage switching using the leakage inductance of the transformer 540, and the first and second resonant diodes Do1 and Do2 in the resonance unit 550 may perform the zero-current switching using the series resonance of the first and second resonant capacitors Co1 and Co2 in the resonance unit 550. Therefore, power efficiency may be improved.

Figure 5:
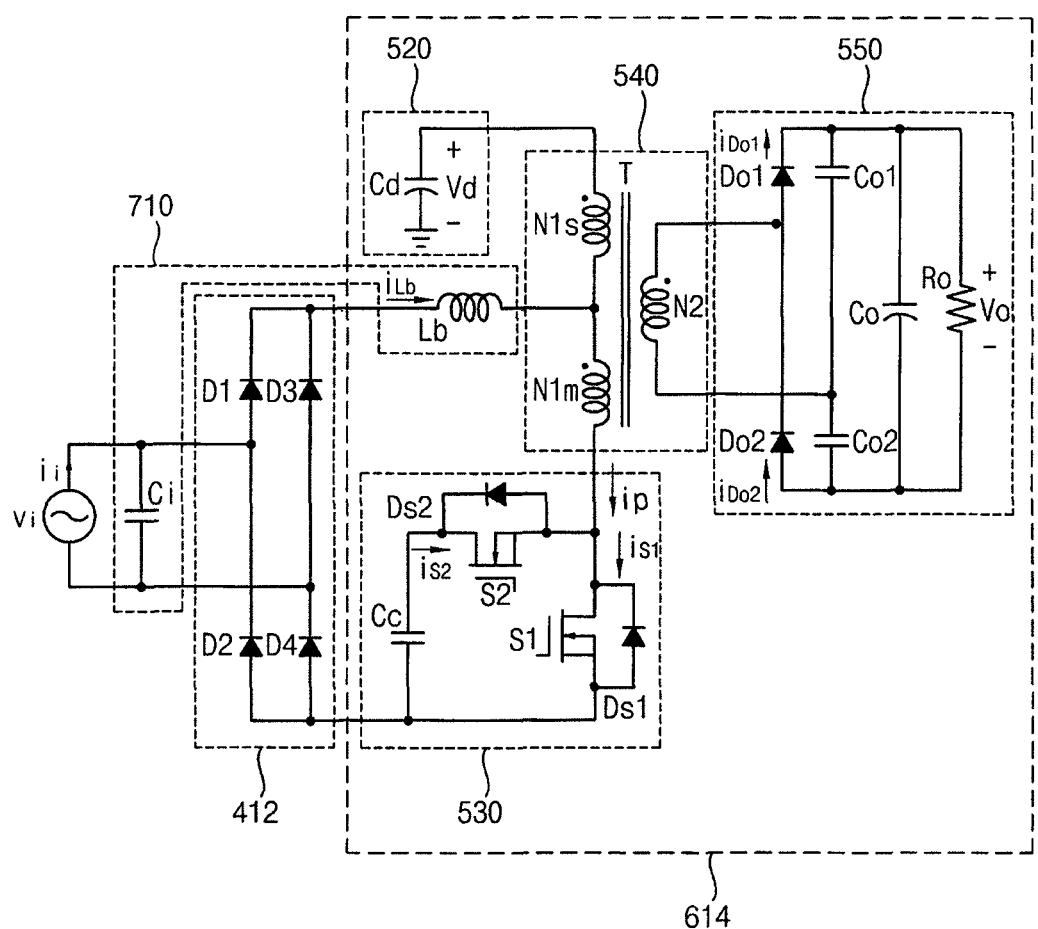
FIG. 5 is a block diagram illustrating a display apparatus according to an exemplary embodiment of the present invention.

FIG. 5 is a block diagram illustrating a display apparatus according to an exemplary embodiment of the present invention. A DC-DC converter 614 of FIG. 5 is substantially the same as the DC-DC converter 414 described in FIGS. 1 and 2, except that an input capacitor Ci is disposed at an input terminal of the AC-DC rectifier 412 and the feedback diode Db of FIG. 2 is omitted. Thus, the same reference numbers are used for the same elements, and repetitive descriptions are omitted.

A waveform diagram illustrating a current flowing in elements of the DC-DC converter 614 is substantially the same as the waveform diagram illustrating the current flowing in elements of the DC-DC converter 414 as shown in FIG. 3. Thus, the same reference numbers are used for the same elements, and repetitive descriptions are omitted.

A method of supplying power of a power supply apparatus (AC-DC rectifier 412 and DC-DC converter 614) of FIG. 5 is substantially the same as the method of supplying power shown in FIG. 4. Thus, the same reference numbers are used for the same elements, and repetitive descriptions are omitted.

Referring to FIGS. 1 to 3, and 5, the DC-DC converter 614 includes a power factor correction unit 710, the voltage smoothing capacitor 520, the active clamp unit 530, the transformer 540 and the resonance unit 550.

The input capacitor Ci in the power factor correction unit 710 is connected to the AC voltage input part in parallel. For example, the input capacitor Ci is directly charged with the general AC voltage of the AC voltage input part, and the AC-DC rectifier 412 rectifies the charged voltage. In this example, the feedback diode Db of the power supply apparatus 410 according to FIG. 2 may be omitted so that the power factor correction unit 710 is simpler than the one of the power supply apparatus 410.

In accordance with at least one exemplary embodiment of the present invention, a feedback current may linearly increase so that an input current corresponding to an input voltage follows a conversion of the input voltage based on the input voltage and a first voltage applied to a portion of a primary coil of a transformer. Thus, a power factor may be improved.

Additionally, primary and auxiliary switches may perform zero-voltage switching due to leakage inductance of the transformer, and first and second resonant diodes in a resonance unit may perform zero-current switching due to a series resonance of first and second resonant capacitors in the resonance unit. Therefore, power efficiency may be improved.

Although exemplary embodiments of the present invention have been described, those skilled in the art will readily appreciate that various modifications can be made in the exemplary embodiments without departing from the spirit and scope of the present invention. Accordingly, all such modifications are intended to be included within the scope of the disclosure.

What is claimed is:

1. A method of supplying power comprising:
   rectifying an input voltage received from an external device;
   transforming a first voltage across a first primary coil and a second primary coil into a second voltage across a secondary coil isolated from the primary coils, wherein the first voltage is based on the rectified input voltage;
   providing a feedback current from the secondary coil to the primary coils;
   using a series resonance to convert the second voltage to an output voltage; and
   outputting the output voltage,
   wherein the first primary coil is a first inductor, and the second primary coil is a second inductor connected in series to the first inductor.

2. The method of claim 1, further comprising alternately enabling one of a pair of switches that are connected between the second primary coil and an output of a rectifier generating the rectified input voltage.

3. The method of claim 2, wherein the alternately enabling comprises:
   turning on a first one of the switches and turning off a second one of the switches when the input voltage is greater than a voltage across the first primary coil during a first period;
   turning off the first switch and turning on the second switch when the input voltage is less than or equal to the voltage across the first primary coil during a second period after the first; and
   maintaining the switch settings when the input voltage is greater than the voltage across the first primary coil during a third period after the second period.

4. The method of claim 3, wherein during the first period the feedback current linearly increases, during the second period the feedback current linearly decreases, and during the third period the feedback current is 0.

5. The method of claim 1, wherein using the series resonance comprises using a series resonance generated between resonant capacitors in parallel with the output voltage and a leakage inductance of the secondary coil.

6. A power supply apparatus comprising:
   an alternating current to direct current (AC-DC) rectifier configured to rectify an input voltage received from an external device;
   a transformer comprising a primary coil having a first primary coil and a second primary coil, and a secondary coil isolated from the primary coil, the transformer configured to transform a first voltage of the primary coil into a second voltage of the secondary coil;
   a feedback inductor connected to a tap between the first primary coil and the second primary coil and an output of the AC-DC rectifier;
   a resonance unit connected in parallel with the secondary coil and configured to output an output voltage by rectifying the second voltage provided from the secondary coil; and
   a primary switch and an auxiliary switch connected in parallel between the transformer and the AC-DC rectifier.

7. The power supply apparatus of claim 6, further comprising a voltage smoothing capacitor connected to the first primary coil to store electric energy provided from the feedback inductor.

8. The power supply apparatus of claim 6, wherein the primary and auxiliary switch receive a resonance current from the first primary coil.

9. The power supply apparatus of claim 6, further comprising a clamp capacitor disposed at a first end of the auxiliary switch.

10. The power supply apparatus of claim 6, wherein the primary switch is connected to a primary diode in parallel, and the auxiliary switch is connected to a secondary diode in parallel.

11. The power supply apparatus of claim 6, wherein each of the primary switch and the auxiliary switch are configured to perform zero-voltage switching.

12. The power supply apparatus of claim 6, wherein the AC-DC rectifier comprises a full-bridge rectifier.

13. The power supply apparatus of claim 6, further comprising an input capacitor connected between both ends of the AC-DC rectifier.

14. The power supply apparatus of claim 1, wherein the resonance unit comprises resonant diodes in series and resonant capacitors in series.

15. The power supply apparatus of claim 14, wherein the resonant diodes are configured to perform zero-current switching due to a series resonance generated between the resonant capacitors and leakage inductance of the secondary coil.

16. A display apparatus comprising:
a display panel configured to display an image;
a panel driving unit configured to drive the display panel;
a backlight unit configured to provide light to the display panel; and
a power supply apparatus configured to provide power used for the display panel, the panel driving unit and the backlight unit,
wherein the power supply apparatus comprises:
an alternating current to direct current (AC-DC) rectifier configured to rectify an input voltage received from an external device;
a transformer comprising a primary coil having a first primary coil and a second primary coil, and a secondary coil isolated from the primary coil, the transformer configured to transform a first voltage of the primary coil into a second voltage of the secondary coil in a transformation ratio;
a power factor correction unit comprising a feedback inductor which increases or decreases a feedback current linearly by adjusting the transformation ratio, based on a voltage applied to the first primary coil and a rectified input voltage, wherein the feedback inductor is connected to a tap between the first primary coil and the second primary coil;
a resonance unit configured to output an output voltage by rectifying the second voltage provided from the secondary coil; and
an active clamp unit configured to adjust the level of the first voltage based on a duty ratio, which is adjusted in accordance with the output voltage.

17. The display apparatus of claim 16, further comprising a DC-AC inverter configured to generate an AC voltage by receiving the output voltage provided from the power supply apparatus, and provide the backlight unit with the AC voltage.

18. The display apparatus of claim 16, further comprising a common voltage generating part configured to generate a common voltage by receiving the output voltage provided from the power supply apparatus, and provide the display panel with the common voltage.

19. The display apparatus of claim 16, further comprising a gamma voltage generation part configured to generate a gamma voltage by receiving the output voltage provided from the power supply apparatus, and provide the panel driving unit with the gamma voltage.

20. The display apparatus of claim 16, wherein the resonance unit comprises a resonant capacitor and a resonant diode, and the resonant diode performs zero-current switching due to a series resonance generated between the resonant capacitors and leakage inductance of the secondary coil.

* * * * *